Nov. 28, 1939.  D. A. MOONEY  2,181,734

CAPACITOR MOTOR STARTING ARRANGEMENT

Filed July 23, 1938

Inventor:
David A. Mooney,
by Harry E. Dunham
His Attorney.

Patented Nov. 28, 1939

2,181,734

UNITED STATES PATENT OFFICE 2,181,734

CAPACITOR MOTOR STARTING ARRANGEMENT

David A. Mooney, Jamaica Plain, Mass., assignor to General Electric Company, a corporation of New York Application July 23, 1938, Serial No. 220,923

2 Claims. (Cl. 172—279)

My invention relates to single phase capacitor motors and in particular to improved starting arrangements therefor for the purpose of obtaining improved starting characteristics and reducing the size of the control apparatus.

Single phase capacitor motors have main and starting windings and capacity is included in the starting winding circuit to obtain a split in the phase of the currents in the two windings for starting purposes. After starting the motor, the starting winding is cut out of circuit or the capacity therein materially reduced. It has been customary to make such changes between starting and running conditions automatically in response to the speed of the motor at a given speed. According to my invention the change between starting and running conditions is made automatically and progressively in at least two steps and at different speeds for the purpose of substantially improving the starting torque characteristics obtainable with a given motor and amount of starting capacity.

Figure 1:
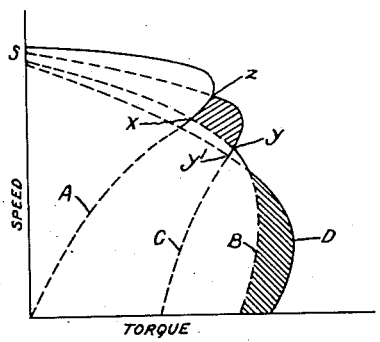
Figure 2:
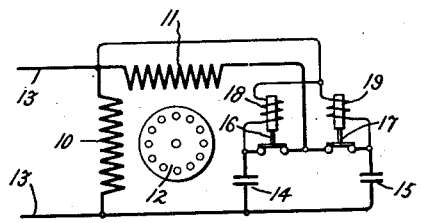
Figure 3:
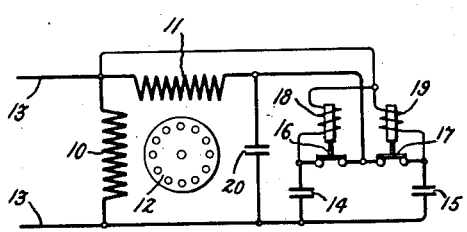
Figure 4:
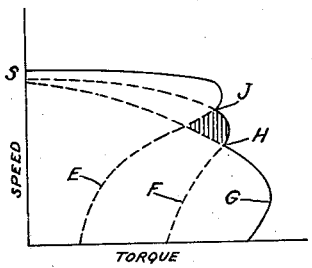

The features of my invention which are believed to be novel and patentable will be pointed out in the claims appended hereto. For a better understanding of my invention reference is made in the following description to the accompanying drawing in which Fig. 1 represents speed torque curves of a single phase motor for various different starting winding circuit conditions. Fig. 2 represents a capacitor start motor having the starting capacitance divided into sections and with provisions for cutting out different sections of the capacitance at different speeds. Fig. 3 represents the same arrangement applied to a motor having a running condenser, and Fig. 4 represents the speed torque curves of the motor of Fig. 3.

Referring to the curves of Fig. 1, curve A represents a typical speed torque curve for a single phase motor obtained with the main winding alone. As indicated, the torque at zero speed is zero and hence, if the motor is to be self-starting, it must be provided with a dephased starting winding connected in parallel with the main winding to produce initial starting torque. If we provide the motor with the usual starting winding and connect the usual amount of capacitance in its circuit the motor will have starting torque substantially in accordance with curve B. Above point $x$ where curve B crosses curve A the amount of capacitance necessary to produce the starting torque of curve B is detrimental, and hence it has been the aim to cut out the starting winding circuit at the speed corresponding to this point or as near this point as possible. The motor will then have a speed torque curve corresponding to the outer convolutions of curves A and B. If S is taken as the no-load speed point of curve A, the speed torque curve of the motor will follow curve B to point $x$, at which speed the starting winding is or should be cut out, and then it will follow curve A to S.

In Fig. 2 I have shown a capacitor start motor having a main winding 10, a starting winding 11 and a high resistance squirrel rotor 12. The motor is supplied with single phase A. C. energy from terminals 13. The starting winding is displaced about 90 degrees with respect to the main winding and its circuit, which is connected in parallel with the main winding, includes two condensers 14 and 15 and two switches 16 and 17. The switches are of the automatic type which are biased to closed positions and opened when their relay coils 18 and 19 are sufficiently energized. These relay coils are shown connected across the starting winding and the respective switches which they control, and hence will be energized in response to the rise in voltage across the starting winding as the speed increases until switches 16 and 17 open, and then will remain energized so long as the motor is energized in response to line voltage, since the voltage across condensers 14 and 15 may be disregarded after their circuits are opened at switches 16 and 17.

If, now, we disconnect the starting winding circuit of Fig. 2, we would obtain speed torque characteristics of the form shown in curve A, Fig. 1. With the starting winding circuit connected, and if it be assumed that the combined capacity of condensers 14 and 15 is equal to that usually employed as a starting capacitor, and both switches 16 and 17 open simultaneously at speed $x$, we would obtain a speed torque curve B—$x$—S as described above.

According to my invention the adjustable starting capacitance is divided into at least two parts, 14 and 15, and the different sections are progressively cut out of circuit at different selected speeds, which may be represented in Fig. 1 as speed $y$ and speed $z$. Coil 19 has a number of turns or is otherwise adjusted to open switch 17 at speed $y$. After such operation, the voltage across coil 19 drops to line voltage and maintains the switch open. This cuts out condenser section 15, leaving only condenser section 14 in the starting winding circuit. Condenser 14, if used without condenser 15 during the complete starting operation, is proportioned to produce starting torque characteristics substantially in accordance with curve C, Fig. 1, and its relay coil 18 is adjusted to open switch 16 at speed z, after which the coil 18 is subjected to line voltage and maintains switch 16 open so long as the motor is energized.

If, now, it be assumed that condensers 14 and 15 together will produce starting torque corresponding to curve B, the motor will now have a complete curve according to the outer convolutions of curves A, B and C or the speed torque characteristics will follow curve B up to speed y, curve C from y to z, and curve A from speed z to no-load speed S. It is seen that I have gained materially in pull-up torque between speeds y and z, the shaded area between points x, y and z representing the improvement. This improvement is obtained without any change in the motor or in the amount of capacitance used but rather in the manner in which the capacitance is utilized.

It will also be seen that now I can use a somewhat higher value of total starting capacitance to advantage. That is, I may increase the capacitance of condenser 15 such that condensers 14 and 15 together will give me a higher starting torque at low speeds according to the curve D. It will now be best to adjust relay coil 19 to cut out condenser 15 at speed y' instead of speed y so that the complete speed torque curve will be as follows: Curve D to y', curve C from y' to z, and curve A from z to S. This outer curve is represented by full lines and the inner parts of the various curves by dotted lines.

It is seen now that I may obtain a very substantial improvement represented by the shaded area between curves B and D as well as the improvement represented by the shaded area between curves B and C, but with a very slight sacrifice adjacent speed y'. It is seen that it would be undesirable to use sufficient capacitance to produce curve D and cut it out in one step at the speed where curve D crosses curve A, because this would leave a more serious low torque dip at the cut out speed than is the case with the conventional arrangement. Also it will be seen that, according to my invention, the motor torque at speed y or y' does not drop below the maximum pull-up torque at speed z and above. Hence, the motor will accelerate any load to above speed z having a torque which does not exceed the maximum available pull-up torque of the motor. This is not true of capacitor motors having a single step capacitor cut out arrangement.

The curves here represented may be modified somewhat as will be understood by those skilled in the art, by various expedients such as changing the resistance of the rotor, the relative ampere turns in the main and starting windings, the relative amount of capacitance in the different condensers. The invention is not limited to employing merely two condenser starting steps but generally two steps will be all that are economically justified.

In Fig. 3 I have represented a capacitor start-capacitor run motor which is physically the same as Fig. 2, except that a third condenser 20 is provided which is permanently connected in the starting winding circuit and hence is available not only for starting purposes but also for power factor correction during normal operation. The three condensers 14, 15 and 20 will be proportioned in relation to the two different speeds where the relays 18 and 19 cut out condensers 15 and 14 to produce the best results. For example, the result shown in the speed torque curves of Fig. 4 can be produced by the arrangement of Fig. 3. In Fig. 4 curve E is that which would be produced by condenser 20 alone, curve F is that which would be produced by condensers 20 and 14, and curve G is that which would be produced by all three condensers. At speed H condenser 15 is cut out and at speed J condenser 14 is cut out to obtain the speed torque curve G—H—J—S. The invention is not confined to the particular control schemes represented. By using two contactors 16 and 17 instead of one, the current carrying capacity and size of the contactors may be reduced accordingly. The invention is particularly useful in large-sized high resistance rotor capacitor motors.

What I claim as new and desire to secure by Letters Patent of the United States is:

1. A capacitor motor having main and starting windings displaced at an angle to each other, a high resistance squirrel cage rotor, variable capacitance means associated with the starting winding circuit for providing split phase starting torque, switching means for reducing the value of such capacitance in a plurality of selected steps greater than one, a plurality of means responsive to the speed of the motor for operating said capacitance reducing switching means, said speed responsive means being adjusted to effect reduction in such capacitance in steps at different speeds selected to maintain the motor torque throughout the starting period at the highest possible value consistent with the number and size of the capacitance reducing steps.

2. A capacitor motor having main and starting windings displaced at an angle to each other, a high resistance squirrel cage rotor, at least three condensers connected in parallel in the starting winding circuit, switches individually connected in series relation with all but one of said condensers, said switches being normally closed, relay coils for opening said switches, each relay coil being connected to be energized in response to the voltage across the starting winding when the switch which the relay controls is closed and substantially in response to the terminal voltage of the motor when such switch is open, said relays being adjusted to open their switches at different voltages corresponding to different selected speeds of the motor as the motor comes up to speed during a starting operation, said speeds being selected to maintain the motor torque throughout the starting period at the highest possible value consistent with the number and capacitance values of the condensers employed.

DAVID A. MOONEY.